United States Patent [19]

Kim

[11] Patent Number: 5,031,051

[45] Date of Patent: Jul. 9, 1991

[54] STILL/SLOW CIRCUIT FOR A VCR WITH TWO HEADS

[75] Inventor: Jong H. Kim, Kyungki, Rep. of Korea

[73] Assignee: Goldstar Co., Ltd., Seoul, Rep. of Korea

[21] Appl. No.: 544,536

[22] Filed: Jun. 28, 1990

[30] Foreign Application Priority Data

Jun. 30, 1989 [KR] Rep. of Korea ............... 9418/1989

[51] Int. Cl.$^5$ ..................... H04N 9/79; H04N 5/78
[52] U.S. Cl. ................................. 358/312; 360/10.1; 360/10.3
[58] Field of Search ............. 358/312; 360/10.1, 10.2, 360/10.3, 75

[56] References Cited

U.S. PATENT DOCUMENTS

| 4,510,533 | 4/1985 | Tokuyama | 360/10.2 |
| 4,772,975 | 9/1988 | Azuma | 360/10.1 |

FOREIGN PATENT DOCUMENTS

54-164229  8/1979  Japan ................... 360/10.2

Primary Examiner—Robert L. Richardson
Assistant Examiner—Thai Tran

[57] ABSTRACT

A still/slow circuit for use in a two-head type VCR includes a digital counter for counting slow indication signals, a pulse oscillator for outputting slow drive control signals in response to outputs of the digital counter, an envelope detector for integrating playback video signals to detect envelopes therefrom, a differentiator for differentiating head-switching signals to output only positive pulse signals, a sample/hold unit for sampling and holding the output signals of the envelope detector by being triggered with the positive pulse signals of the differentiator, an OR-gate unit which allows still indication signal and slow indicating signal to pass therethrough, a comparing unit for comparing as to whether or not the output signal level of the envelope detector is same as the output signal level of the sample/hold unit and outputting an oscillation drive voltage when they do not coincide with each other, a pulse oscillator for outputting still drive control signals, and a differentiator for differentiating the frame advance indication signals to apply those signals together with the output signals of the sample/hold unit to the comparing unit, whereby the still/slow circuit carries out the still playback, slow playback, and frame advance operations.

2 Claims, 4 Drawing Sheets

FIG. 1
PRIOR ART
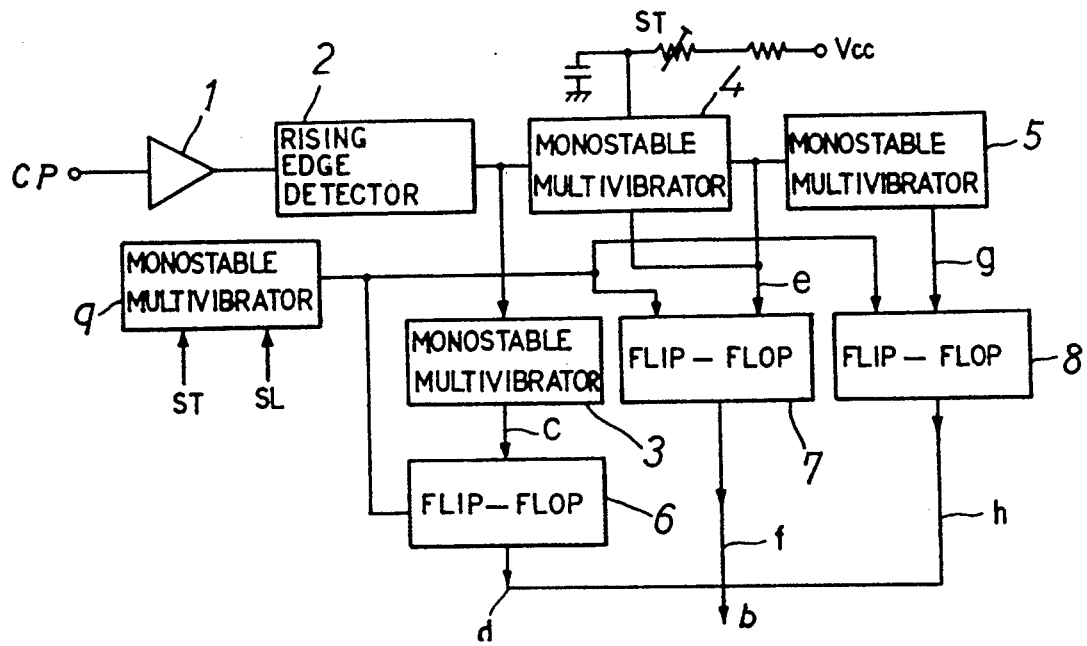
FIG. 2A
FIG. 2B
FIG. 2C
FIG. 2D
FIG. 2E
FIG. 2F
FIG. 2G
FIG. 2H
PRIOR ART

STILL/SLOW CIRCUIT FOR A VCR WITH TWO HEADS

BACKGROUND OF THE INVENTION

1. Field of the Invention

The present invention relates to a still/slow circuit for use in a two-head type video cassette tape recorder (hereinafter "VCR") and more particularly, to a circuit for use in a VCR of the two-head PAL system which performs smoothly the still and slow playback operations with existing two heads.

2. Description of the Prior Art

Conventionally, several types of still and slow circuits provided the function of the still and slow playback in a VCR having four heads or heads for still function are well known in the art.

FIG. 1 is a block diagram show in one of such conventional apparatuses for still/slow function, which comprises an amplifier 1 for amplifying playback control pulses CP, a rising edge detector 2 for detecting rising edges out of outputs from the amplifier 1, first and second monostable multivibrators 3 and 4 for generating signals of a predetermined width in response to the detected signals of the rising edge detector 2, a third monostable multivibrator 5 for generating signals of a predetermined width when the output of the second monostable multivibrator 4 is finished, a first flip-flop 6 for outputting high potential pulses which are drive initiation voltage during signals of a predetermined width is outputted from the monostable multivibrator 3, a second flip-flop 7 for outputting high potential pulses which are normal drive voltages during signals of a predetermined width is outputted from the second monostable multivibrator 4, a third flip-flop 8 for outputting low potential pulses which are stop voltages during signals of a predetermined width is outputted from the third monostable multivibrator 5, and a fourth monostable multivibrator 9 for making the first, second, and third flip-flops 6, 7, and 8 enabled by a still indication signal ST or a slow indication signal SL.

Such conventional circuit having the configuration as above operates as follows:

A normal playback capstan control circuit is stopped its operation at the time of still or slow operation, while the fourth monostable multivibrator 9 makes the first, second, and third flip-flops 6, 7, and 8 enabled by the still indication signal ST or the slow indication signal SL.

As a result, the playback control pulses as shown in FIG. 2A are amplified at the amplifier 1 and applied to the rising edge detector 2 at which rising edges are detected. By these detected signals, signals of a predetermined width as shown in FIGS. 2C and 2E are outputted from the first and second monostable multivibrators 3 and 4. At this time, the widths of the output signals of the second monostable multivibrator 4 can be varied properly by varying a variable resistor ST for slow tracking.

The signals outputted from the second monostable multivibrator 4 causes the third monostable multivibrator 5 to output the signals of a predetermined width as shown in FIG. 2G.

At the first, second, and third flip-flops 6, 7, and 8, signals of the waveforms are outputted as shown in FIGS. 2D, 2F, and 2H respectively, during the signals of a predetermined width are outputted from the first, second and third monostable multivibrators 3, 4, and 5.

The output signals of the first, second, and third flip-flops 6, 7, and 8 are so mixed as shown in FIG. 2B, as to be applied as a capstan motor control signal, so that the still or slow operation can be carried out.

That is, the high level region represents a drive initiation region, the medium level region represents a normal drive region, and the low level region represents a stop period in the waveforms as shown in FIG. 2B.

However, such conventional apparatus can only be applied to a VCR provided with heads for still operation or a four-head of double azimuth and it requires expensive parts and complicate structure. Specifically, in a two-head type, two heads trace in turn two tracks to perform a normal playback, and in case when the normal playback operation is stopped, the tracing slant angles thereof become different from each other, which causes the two heads not to be precisely accorded to the two tracks. That is, when the two heads are precisely accorded to the two tracks any noise is not produced, while they are not precisely accorded to the two tracks a noise is produced. There is not provided any means to control such a noise it is not possible to be utilized in the VCR of two-head type. And the existing two-head type VCR is not possible to perform the slow and still playback operations.

SUMMARY OF THE INVENTION

Accordingly, it is an object of the present invention to provide a still/slow circuit capable of performing smoothly the still and slow playback operations, which is able to be applied to a two-head type VCR which is of a popular-priced model.

Another object of the present invention is to provide a still/slow circuit with a simple structure for a two-head type VCR which carries out a function of frame advance without requiring expensive parts.

A further object of the present invention is to provide an improved still/slow circuit which includes a digital counter for counting slow indication signals at a predetermined period, a pulse oscillator for outputting slow drive control signals of a predetermined period in response to outputs of the digital counter, an envelope detector for integrating playback video signals to detect envelopes therefrom, a first differentiator for differentiating head-switching signals to output only positive pulse signals, a sample/hold unit for sampling and holding the output signals of the envelope detector by being triggered with the positive pulse signals of the differentiator, an OR-gate unit for allowing still indication signal and slow indication signal to pass therethrough, a comparing unit for being operated by the still indicating signal or the slow indication signal that passed through the OR-gate unit and compares as to whether or not the output signal level of the envelope detector is same as the output signal level of the sample/hold unit and outputs an oscillation drive voltage when they are not identical with each other, a pulse oscillator for outputting still drive control signals of a predetermined period by being oscillated by the oscillation drive voltage of the comparing unit, and a second differentiator for differentiating the frame advance indication signals to apply those signals together with the output signals of the sample/hold unit to the comparing unit.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a still/slow circuit for use in a two-head type VCR includes a digital counter for counting slow indication signals, a pulse oscillator for outputting slow drive control signals in response to outputs of the digital counter, an envelope detector for integrating playback video signals to detect envelopes therefrom, a differentiator for differentiating head-switching signals to output only positive pulse signals, a sample/hold unit for sampling and holding the output signals of the envelope detector by being triggered with the positive pulse signals of the differentiator, an OR-gate unit which allows still indication signal and slow indicating signal to pass therethrough, a comparing unit for comparing as to whether or not the output signal level of the envelope detector is same as the output signal level of the sample/hold unit and outputting an oscillation drive voltage when they do not coincide with each other, a pulse oscillator for outputting still drive control signals, and a differentiator for differentiating the frame advance indication signals to apply those signals together with the output signals of the sample/hold unit to the comparing unit, whereby the still/slow circuit carries out the still playback, slow playback, and frame advance operations.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a block diagram of a conventional still/slow circuit;

FIGS. 2A to 2H are output waveform views of each section of FIG. 1;

DESCRIPTION OF THE PREFERRED EMBODIMENTS

Figure 3:
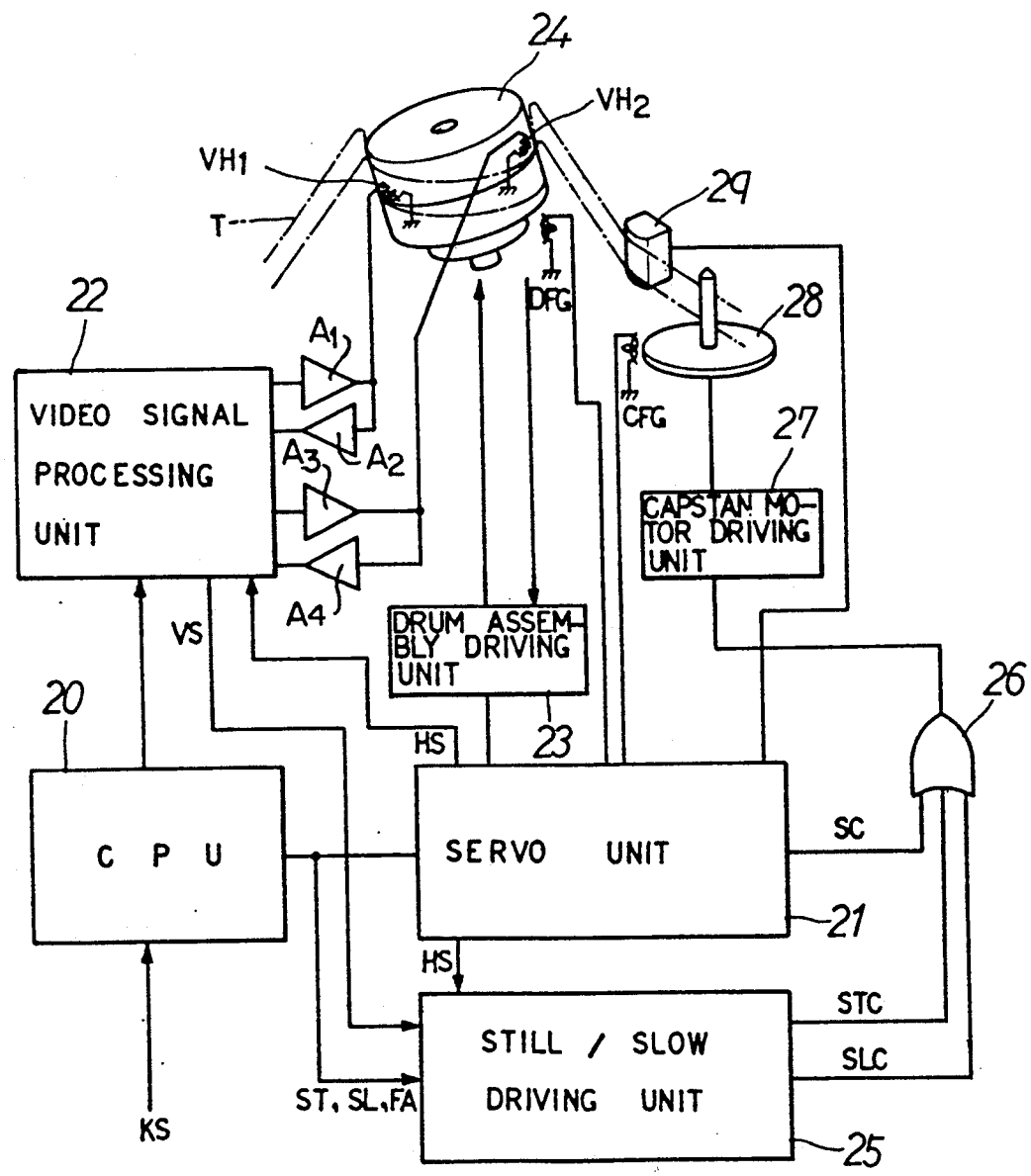
FIG. 3 is a control block diagram of the VCR to which still/slow circuit according to the present invention is applied.
Figure 4:
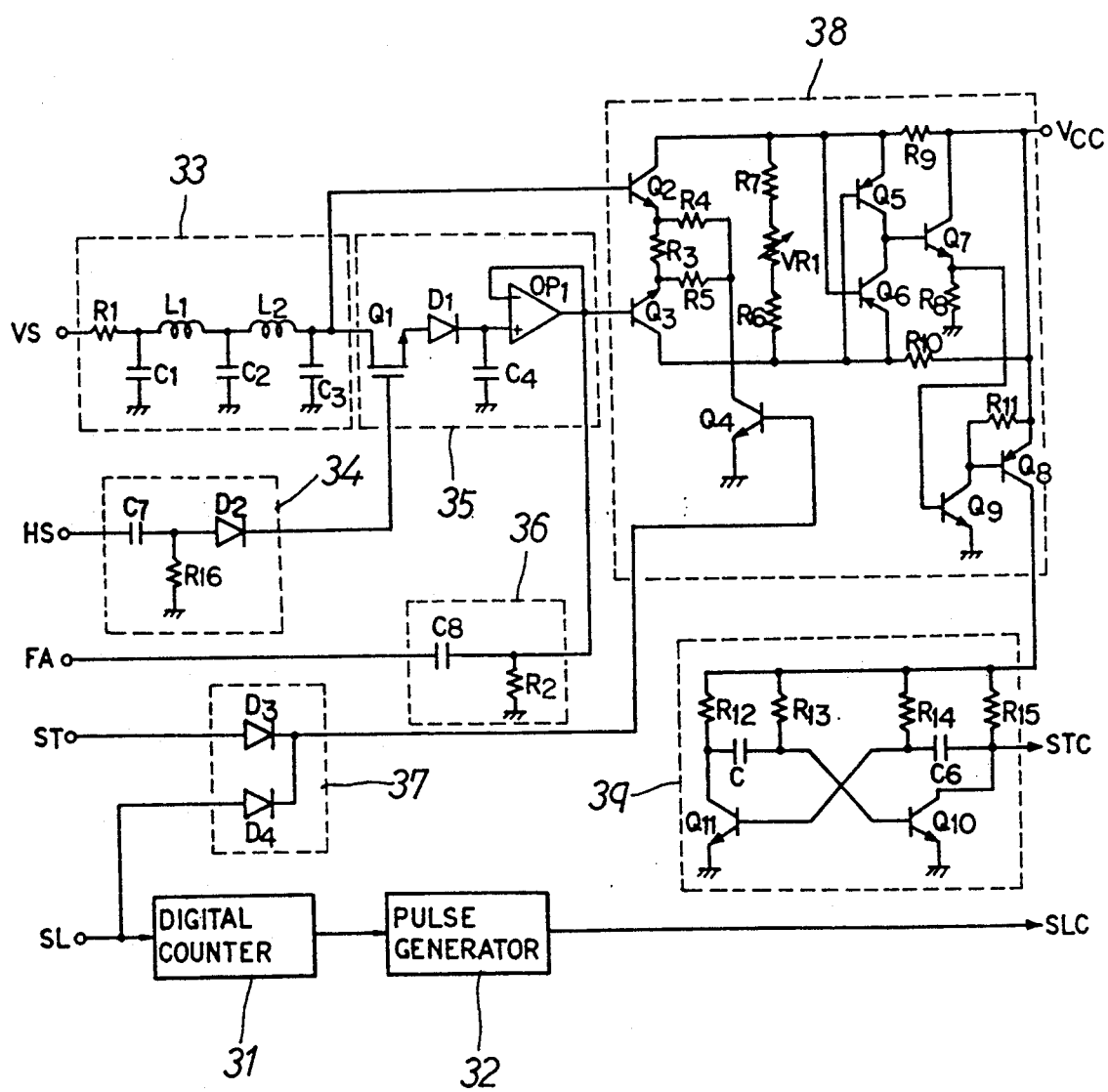
FIG. 4 is a circuit diagram of the still/slow circuit of the VCR according to the present invention.

Referring now in detail to the drawings for the purpose of illustrating preferred embodiments of the present invention, the still/slow circuit as shown in FIGS. 3 and 4, comprises a central processing unit (hereinafter "CPU") 20 for receiving various key signals KS to control the whole operations of the system, a servo unit 21 for being under the control of the CPU 20 and receiving signals from a drum frequency generating head DFG and a capstan frequency generating head CFG to perform various servo controls, a video signal processing unit 22 for being under the control of the CPU 20 and receiving a head-switching signal HS from the servo unit 21 to process playback video signals and recording video signals, a drum assembly drive unit 23 for controlling the driving of a drum assembly 24 upon the control of the servo unit 21, a still/slow drive unit 25 for being under the control of the CPU 20 and receiving playback video signals from the video signal processing unit 22 and head-switching signals from the servo unit 21 so as to output a still drive control signal STC and a slow drive control signal SLC, an adder 26 for adding the normal drive control signal SC of the servo unit 21, the still drive control signal STC, and slow drive control signal SLC of the still/slow drive unit 25, and a capstan motor drive unit 27 for receiving output signals of the adder 26 to control the driving of a capstan motor 28. In the drawing, reference numeral 29 denotes a control head for being under the control of the servo unit 21, $A_1$ and $A_3$ are amplifiers for amplifying recording video signals of the video signal processing unit 22 and applying those signals respectively to video heads $VH_1$ and $VH_2$, $A_2$ and $A_4$ are amplifying video signals which are reproduced at the video heads $VH_1$ and $VH_2$ and applying those signals to the video signal processing unit 22, and T represents a video tape.

Referring now to FIG. 4 which is a detailed circuit diagram of the still/slow drive unit 25 of FIG. 3, the still/slow drive unit 25 comprises a digital counter 31 for counting the slow indication signals at a predetermined period which are outputted from the CPU 20, a pulse oscillator 32 for outputting pulse signals of a predetermined period as the slow drive control signal SLC in response to the output of the digital counter 31, an envelope detector 33 for integrating the playback video signal VS of the video signal processing unit 22 to detect envelopes therefrom, a first differentiator 34 for differentiating the head-switching signal HS of the servo unit 21 to output only positive pulse signals, a sample/hold unit 33 for sampling and holding the output signals of the envelope detector 33 by being triggered with the positive pulse signals of the first differentiator 34, a second differentiator 36 for differentiating the frame advance indication signal FA of the CPU 20, an OR-gate unit 37 for allowing the still indication signal ST and a slow indication signal SL of the CPU to pass therethrough, a comparing unit 38 for being operated by the still indicating signal ST or the slow indication signal SL passed through the OR-gate unit 37 and comparing as to whether the output signal level of the envelope detector 33 is same as the output signal level of the sample/hold unit 35 and the output signal level of the second differentiator 36 and then outputs an oscillation drive voltage when they are not identical to each other, and a pulse oscillator 39 for outputting the still drive control signal STC of a predetermined period by being oscillated by the oscillation drive voltage of the comparing unit 38.

The operation and effect of the present invention will be described in detail with reference to the waveform views of FIGS. 5A to 5H.

Figure 5A:
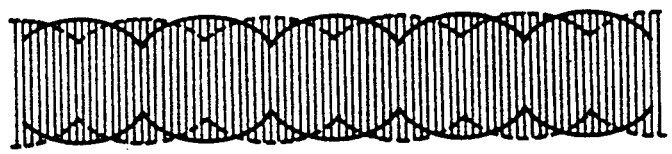
FIGS. 5A to 5H are waveform views of each section of FIG. 4.
Figure 5B:

In a playback mode, video signals being reproduced at the video heads $VH_1$ and $VH_2$ are amplified by the amplifiers $A_2$ and $A_4$ and processed by the video signal processing unit 22. When the playback video signal VS of the waveforms as shown in FIG. 5A are outputted, these signals are integrated consecutively through a resistor $R_1$, a ground capacitor $C_1$, a coil $L_1$, a ground capacitor $C_2$, a coil $L_2$ and a ground capacitor $C_3$ of the envelope detector 33 and the envelopes of the signals are detected as shown in FIG. 5B and applied to a base of a transistor $Q_2$ of the comparing unit 38.

Figure 5C:
Figure 5D:
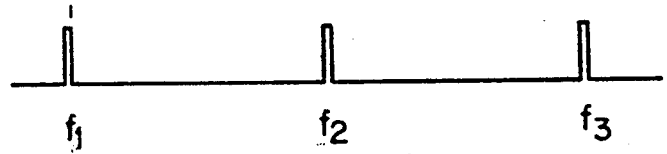
Figure 5E:
Figure 5F:

And at this time, head-switching signals as shown in FIG. 5F are outputted from the servo unit 21 and differentiated by a capacitor $C_7$ and a resistor $R_{16}$ of the first differentiator 34 as shown in FIG. 5E. Only a positive pulse signal among the differential pulse signals makes a field effect transistor $Q_1$ of the sample/hold unit 35 conductive through a diode $D_1$. Each time ($t_1$, $t_2$ and $t_3$) that the field effect transistor $Q_1$ becomes conductive, the detected envelope signals of the envelope detector 33 are sampled through the field effect transistor $Q_1$ as shown in FIG. 5D and held by being charged to a capacitor $C_4$ through a diode $D_1$. The charged voltage of the capacitor $C_4$ is applied to a base of a transistor $Q_3$ of the comparing unit 38 through an operational amplifier $OP_1$.

Meanwhile, in a normal playback mode, the still indicating signal ST and the slow indicating signal SL are not outputted from the CPU 20, as a result a low potential signal is outputted from the OR-gate unit 37 whereby the transistors $Q_4$, $Q_2$ and $Q_3$ of the comparing unit 38 keep the off-state. Therefore, since both the end voltages of the resistors $R_6$ and $R_7$ and a variable resistor $VR_1$ are maintained equilibrium, the transistors $Q_5$ and $Q_6$ are turned off and thus the transistor $Q_7$ keeps the off-state. Therefore, transistors $Q_7$ and $Q_8$ also maintain the off-state and thus the power cannot be supplied to the pulse oscillator 39.

As a result, at this time, a normal drive control signal SC being outputted from the servo unit 21 is applied to the capstan motor drive unit 27 through the adder 26 so that the normal playback operation is carried out.

In such a state, when a high potential still indicating signal ST is outputted from the CPU 20 by selecting a still mode, the normal drive control signal SC is not outputted at the servo unit 21 and the high potential still indication signal ST makes the transistor $Q_4$ of the comparing unit 38 conductive through the diode $D_3$ of the OR-gate unit 37, whereby the transistors $Q_2$ and $Q_3$ are in a state of turning on. At this moment, when a potential difference occurs between the signal being outputted from the envelope detector 33 and the signal being sampled and outputted from the sample/hold unit 35, the conductivity of the transistors $Q_2$ and $Q_3$ becomes different from each other so that the equilibrium state of the resistors $R_3$ to $R_5$ is broken down. Therefore, a potential difference passing through the resistors $R_6$ and $R_7$ is generated to make the transistor $Q_5$ or the transistor $Q_6$ conductive. That is, in case the output signal level of the sample/hold unit 35 is higher than that of the envelope detector 33, the potential of the collector of the transistor $Q_3$ becomes lower than that of the transistor $Q_2$ so that the transistor $Q_5$ becomes conductive. Likewise, in case the output level of the sample/hold unit 35 is lower than that of the envelope detector 33, the transistor $Q_6$ becomes conductive. Thus since a high potential is applied to a base of the transistor $Q_7$ according as the transistor $Q_5$ or the transistor $Q_6$ becomes conductive, the transistor $Q_7$ becomes conductive and a high potential is outputted from an emitter thereof, and this high potential makes the transistor $Q_9$ conductive and also the transistor $Q_5$ becomes conductive.

Accordingly, the power from the power terminal Vcc is applied to the pulse oscillator 39 as an oscillation drive voltage through a transistor $Q_8$.

Figure 5G:
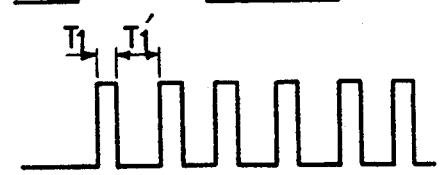

Therefore, the pulse oscillator 39 performs an oscillation operation to output the still drive control signal ST of the wave forms as shown in FIG. 5G. The still drive control signal ST is applied to the capstan motor drive unit 27 through the adder 26 to carry out the still playback operation by driving intermittently the capstan motor 28. When the playback video signal VS as shown by dotted line in FIG. 5A is applied by carrying out the still operation as above, the playback video signal VS is integrated at the envelope detector 33 and applied to a base of the transistor $Q_2$ of the comparing unit 38 after the envelope being detected as shown in FIG. 5C. The output signal of the envelope detector 33 is sampled and held at each time ($t_1$, $t_2$ and $t_3$) that positive pulse signals are outputted from the first differentiator 34 and applied to a base of the transistor $Q_3$ of the comparing unit 38. When the levels of the signals being applied respectively to bases of the transistors $Q_2$ and $Q_3$ become identical to each other, the resistors $R_3$ to $R_5$ are maintained equilibrium so that transistors $Q_5$ and $Q_6$ are turned off, thereby transistors $Q_7$, $Q_9$ and $Q_8$ are also turned off. As a result, an oscillation drive voltage is not applied to the pulse oscillator 39 and the pulse oscillator 39 stops the oscillating operation.

Accordingly, the capstan motor 28 is in a stop state at the point where no noise exists. In such a state, when a high potential frame advance indication signal FA is outputted from the CPU 20, the frame advance signal FA is differentiated at the second differentiator 36 and applied to a base of the transistor $Q_3$ of the comparing unit 38 to break down the equilibrium state, thereby the comparing unit 38 and pulse oscillator 39 being operated causing the capstan motor 28 to stop at the one frame advanced point.

Meanwhile, when a high potential slow indicating signal SL is outputted at the CPU 20, the signal SL makes the transistor $Q_4$ of the comparing unit 38 conductive through the diode $D_4$ of the OR-gate unit 37, thereby the comparing unit 38 and pulse oscillator 39 being operated as same as the still mode causing the pulse oscillator 39 to output the still drive control signal ST of the waveforms as shown in FIG. 5G.

Figure 5H:
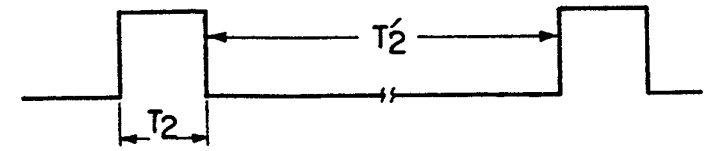

At this moment, the digital counter 31 receives the high potential slow indication signal SL and drives the pulse oscillator 32 at a predetermined period. Therefore, the pulse oscillator 32 outputs the slow drive control signal SLC of the waveforms as shown in FIG. 5H. Accordingly, the capstan motor 28 is continuously driven to reproduce several frames at the high potential region $T_2$ of the slow drive control signal SLC. Thereafter, at the low potential region $T_2'$ of the slow drive control signal SLC, the capstan motor 28 is driven intermittently by the still drive control signal STC of the pulse oscillator 39 and then when the output signal level of the envelope detector 33 and the output signal level of the sample/hold unit 35 are identical to each other, the driving of the capstan motor 28 is stopped, thereby entering into a stop state in a clear screen. It is possible to determine the advancing speed of the slow playback screen by selecting properly or varying the high potential region $T_2$ and the low potential region $T_2'$ of the slow drive control signal SLC.

As described above in detail, the present invention has the effect that can carry out the still playback operation without noise in a two-head type VCR which is a popular-priced model and also performs the slow playback and frame advance operation without requiring high-priced parts.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A still/slow circuit for use in a two-head type VCR, which comprises:
   a digital counter for counting a slow indication signal at a predetermined period,
   a pulse oscillator for outputting a pulse signal of a predetermined period as a slow drive control signal in response to the output of said digital counter,
   an envelope detector for detecting envelopes by integrating the playback video signal,
   a first differentiator for outputting only a positive pulse signal by differentiating a head-switching signal,
   a sample/hold unit for sampling and holding the output signal of said envelope detector by being triggered with the positive pulse signal of said first differentiator,
   a comparing unit driven by either a still indication signal or a slow indication signal for outputting an oscillation drive voltage when the output signal level of said envelop detector and the output signal level of said sample/hold unit are not identical to each other by comparing the two signal levels, and
   a pulse oscillator for outputting a still drive control signal of a predetermined period by being oscillated with the oscillation drive voltage of said comparing unit.

2. The still/slow circuit of claim 1, wherein a frame advance indication signal is differentiated at a second differentiator and applied to said comparing unit together with the output signal of said envelope detector.

* * * * *